UNITED STATES PATENT OFFICE.

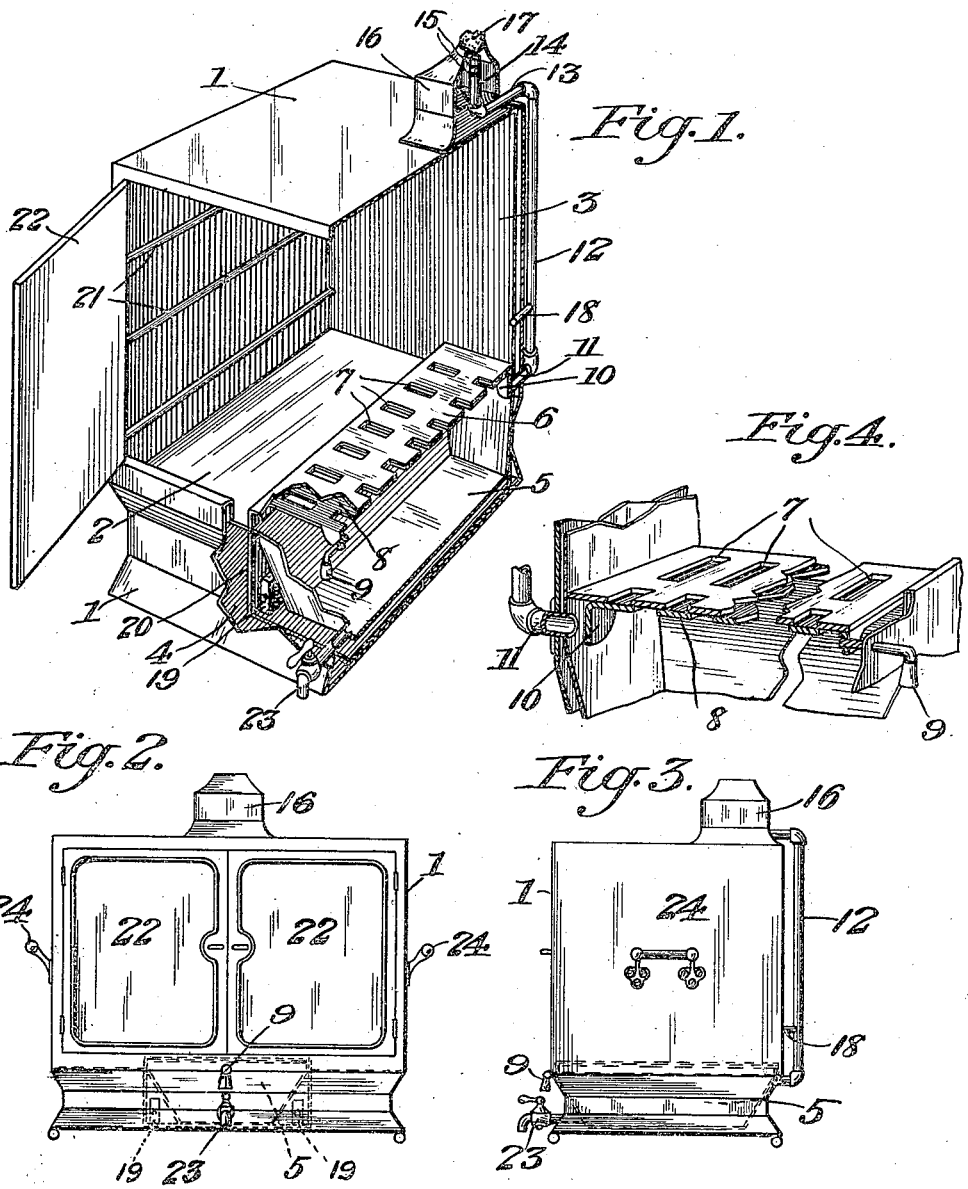

WAYNE A. DUNCAN, OF CHICAGO, ILLINOIS.

STEAM COOKER.

1,421,425.  Specification of Letters Patent.  Patented July 4, 1922.

Application filed May 23, 1921. Serial No. 471,692.

*To all whom it may concern:*

Be it known that I, WAYNE A. DUNCAN, a citizen of the United States, residing at Chicago, State of Illinois, have invented certain new and useful Improvements in Steam Cookers; and I do hereby declare the following to be a full, clear, and exact description of the invention, such as will enable others skilled in the art to which it appertains to make and use the same.

This invention relates to certain inventions in cookers, and particularly to steam cookers of the electrically heated domestic type, but it is of course to be understood that the invention is not to be limited to any specific type or size of cooker.

The principal object of the invention is to provide for the conservation of the water supply employed for generating the necessary steam during the operation of the cooker, and to this end, means associated with the cooker are provided for collecting the steam as it is exhausted therefrom, condensing the same, and returning the condensate to the water pan or receptacle of the cooker in which the steam is generated.

A further object of the invention is to provide means for adjustably regulating the supply of steam to the oven compartment of the cooker, and, if necessary, cut off the steam supply entirely from the oven, which operation will open an exhaust for the steam whereby the same will be conducted directly into the condensing means. Means are also provided for exhausting the steam remaining in the oven after the steam supply has been cut off, said exhaust steam also being conducted to the condensing means for the purpose above set forth.

A further object, that will be noted upon referring to the following specification, is that the steam during its course through the condenser passes three points of condensation and thereby assures a complete condensation thereof.

Briefly stated, the invention comprises a cooker, preferably of metallic, rectangular construction, transversely divided into an upper portion forming an oven and a smaller lower base portion comprising a heating chamber. In the preferred construction, the lower chamber is heated electrically but it is to be understood that any desired source of heat may be employed.

Disposed about midway of the transverse, horizontal partition separating the oven and the heating chamber, and depending downwardly therefrom into said heating chamber, is a water pan or receptacle for generating the necessary steam during the operation of the cooker. The top of the water pan is provided with perforations, and slidably positioned beneath said perforated top is a plate, similarly perforated, which in sliding is adapted to cover or uncover the perforations in the top of the water pan, whereby a regulable supply of steam can either be admitted to the oven or said supply may be cut off entirely when it is necessary to use the cooker for baking purposes. This sliding plate is provided with means for operating the same and also with means for permitting the steam generated in the pan to be exhausted directly into a condensing means when the steam is shut off from the oven.

This condensing means is of novel construction and design and the steam during its course therethrough is completely condensed and the condensate automatically returned to the water pan as it accumulates, the particular construction and operation of said condensing means to be more fully set forth in the following specification.

The preferred embodiment of the invention is illustrated in the accompanying drawings, in which—

Fig. 1 is a half-sectional view partly in elevation, illustrating the various parts of the cooker construction.

Fig. 2 is a front elevation thereof.

Fig. 3 is an end elevation, and

Fig. 4 is an enlarged detailed view illustrating the construction and operation of the perforated sliding plate.

Referring to the drawings in detail, the improved cooker 1, which is preferably rectangular in shape and of metallic construction, is transversely divided by a horizontal partition 2 forming an upper portion 3 comprising the oven compartment, and a lower smaller base portion 4 forming the heating compartment. Centrally disposed of the horizontal partition 2, and depending downwardly therefrom into the heating chamber 4, is a pan or receptacle 5 for receiving the water for generating the necessary steam during the operation of the cooker.

The top 6 of the pan 5 is provided with a series of perforations 7 through which the steam is admitted to the oven 3. Slidably disposed beneath the top 6 is a plate 8, said plate being also provided with perforations similar to the perforations 7 formed in the top 6 of the receptacle 5, and adapted to register therewith when said plate is in its extreme rearward position. This sliding plate 8 in its opposite extreme position is adapted to cover the perforations 7 and thereby shut off the supply of steam to the oven 3. For operating this plate the same is provided with a handle 9, which handle is so positioned as to project outwardly from the front of the cooker 1. The rear end of the sliding plate 8 is provided with a downwardly projecting semi-circular portion 10 which is adapted to cover the inwardly projecting end of the pipe section 11, which pipe section forms the lower end of a condensing pipe 12 extending upwardly and alongside of the rear of the cooker 1. The upper end of this condensing pipe 12 is provided with a horizontal pipe extension 13 extending over the rear top portion of the cooker 1, and to the end of the horizontal pipe extension 13 is secured a vertically disposed pipe section 14, the upper end thereof being provided with a series of perforations 15.

This vertically disposed pipe section 14 and a portion of the horizontally disposed pipe section 13 is inclosed in a small chamber or compartment 16, said compartment being of such construction as to retain a supply of water or similar cooling fluid surrounding the upper portion of the pipe condenser for cooling said pipe and facilitating the condensing of the steam directed therethrough. Located in the top of the compartment 16 is a perforated seat or recess adapted to receive a sponge or the like 17, which is normally maintained in a wet or moist condition.

Extending inwardly from the condenser pipe 12, and disposed slightly above the pipe extension 11, is another pipe extension 18 extending through the walls of the cooker into the oven compartment, to permit the steam to escape during the operation of the cooker.

The steam is generated in the receptacle 5 by heat supplied to the heating compartment 4 in any desired manner, but in the preferred construction said heating compartment is provided with an electrical resistance element 19 placed along each side of the receptacle 5 and inclosed within a sub-compartment 20. The heating element not only furnishes the necessary heat for generating steam to be admitted to the oven when desired, but when said steam is shut off from the oven by the regulating plate 8 and allowed to escape into the condensing pipe 12, said heating element will supply the necessary heat to the oven for baking purposes. With this construction, a dry heat as well as a moist heat can be supplied to the oven 3 by a simple manipulation of the regulating plate 8.

The oven portion 3 of the cooker 1 is preferably of double-wall construction, the inner side walls being provided with shelf or tray-supporting ribs or guides 21, in the usual manner. The front of the oven is supplied with the customary doors 22 and a faucet or the like 23 may also be provided for furnishing a simple means of draining the compartment 5, said faucet being so located as to be operated from without the cooker in a manner similar to the location and operation of the slide-operated handle 9. For the purpose of transporting the cooker, the ends thereof are supplied with handles or the like 24.

From the above description the operation of the apparatus will be perfectly obvious. As the water-containing receptacle 5 is heated sufficient steam will be generated for furnishing one means of operating the cooker. If a dry heat is desired, the steam may be prevented from entering the cooker by the regulating slide 8 closing the perforations 7 in the top 6 of the receptacle 5, which operation will cause the depending disc-like member 10 to uncover the end of the pipe section 11 and permit the steam in the receptacle 5 to escape into the condensing pipe 12, which pipe, being cooled by the air, will cause a condensation of a portion of the steam passing therethrough. As the steam continues upwardly it is further condensed in the pipe sections 13 and 14 inclosed by the small condensing chamber or compartment 16, which, as hereinbefore stated, is cooled by being supplied with a certain amount of water. As the steam is condensed in the various pipe sections the condensate will flow back into the receptacle 5. A certain portion of the steam, however, which is not condensed during its course through the various pipe sections, will escape through the perforations 15 formed in the vertically disposed pipe section 14, whereupon it will be finally condensed by either striking the water-soaked sponge 17 or the cool inner walls of the compartment 16, this condensation being collected in said compartment 16, adding to the water supply already within the compartment. As the water is increased therein and rises it is drawn off through the perforations 15 and directed back into the receptacle or steam compartment 5.

With the above arrangement the cooker can be run with the minimum amount of water, which water supply is conserved to the fullest extent, requiring only an occasional replacing of the water, and for these reasons the apparatus requires very little attention and the operation, therefore, is greatly simplified.

What I claim is:

1. In a cooker comprising an oven chamber, the combination with a steam generating compartment, perforations in the top of said compartment for admitting the steam to the oven, a perforated plate for opening and closing the perforations in the top of said steam generating compartment, said perforated plate also provided with means for permitting the exhaust of the steam upon the closing of the perforations in the top of the steam compartment.

2. In a cooker comprising an oven chamber, the combination with a steam generating compartment, means for heating said compartment, perforations in the top of said compartment for admitting the steam to the oven, a perforated plate for opening and closing the perforations in the top of said steam generating compartment, said perforated plate also provided with means for permitting the exhaust of the steam upon the closing of the perforations in the top of the steam compartment, and means for condensing said steam and returning the condensate to the steam generating compartment.

3. In a cooker, the combination with an oven compartment and a heating compartment, of a steam supply chamber interposed between said oven and heating compartments, electrical means located in said heating compartment for heating the oven and also the steam supply chamber, perforations in the top of said steam supply chamber for admitting the steam to the oven, a perforated plate for opening and closing the perforations in the top of said steam generating compartment, said perforated plate also provided with means for permitting the exhaust of the steam upon the closing of the perforatons in the top of the steam compartment, and means for condensing said steam and returning the condensate to the steam generating compartment.

In testimony whereof I affix my signature.

WAYNE A. DUNCAN.